(12) United States Patent
Wu et al.

(10) Patent No.: US 7,836,337 B1
(45) Date of Patent: Nov. 16, 2010

(54) METHOD AND SYSTEM FOR RESTORATION OF A MOBILE DEVICE TO ITS STATE PRIOR TO LOSS OF STANDARD MEMORY

(75) Inventors: Dennis Huanyu Wu, San Bruno, CA (US); Huy Nguyen, San Jose, CA (US); Zhenye Zhu, Fremont, CA (US); Vinay Kothiyal, San Jose, CA (US)

(73) Assignee: Wavelink Corporation, Midvale, UT (US)

( * ) Notice: Subject to any disclaimer, the term of this patent is extended or adjusted under 35 U.S.C. 154(b) by 1147 days.

(21) Appl. No.: 10/888,289

(22) Filed: Jul. 9, 2004

Related U.S. Application Data (60) Provisional application No. 60/502,752, filed on Sep. 12, 2003.

(51) Int. Cl.
*G06F 11/00* (2006.01)
(52) U.S. Cl. ................................. 714/15; 714/5; 714/42
(58) Field of Classification Search ..................... 714/42
See application file for complete search history.

(56) References Cited

U.S. PATENT DOCUMENTS

| | | | |
|---|---|---|---|
| 6,704,849 B2 * | 3/2004 | Steegmans | 711/162 |
| 6,871,271 B2 * | 3/2005 | Ohran et al. | 711/162 |
| 7,228,152 B1 * | 6/2007 | Shinohara et al. | 455/557 |
| 2003/0237021 A1 * | 12/2003 | Ching et al. | 714/15 |

* cited by examiner

*Primary Examiner*—Yolanda L Wilson
(74) *Attorney, Agent, or Firm*—Graybeal Jackson LLP; Dylan O. Adams (57) ABSTRACT

A method, system, and computer program product for restoration of a mobile device to its state prior to loss of application software and data stored in standard memory storage. A core agent is deployed into the standard memory storage of the mobile device and a persistent agent is deployed into the persistent memory storage of the mobile device. The persistent agent is an installation version of the core agent. In the event of loss of application software and data stored in standard memory storage, the core agent is re-deployed into the standard memory storage of the mobile device using the deployed persistent agent. The core agent, in conjunction with a host server facilitates the re-deployment of the application software and the data into the standard memory storage of the mobile device. The mobile device is thus restored to its state prior to loss of standard memory.

20 Claims, 7 Drawing Sheets

METHOD AND SYSTEM FOR RESTORATION OF A MOBILE DEVICE TO ITS STATE PRIOR TO LOSS OF STANDARD MEMORY

REFERENCE TO RELATED APPLICATIONS

This application claims priority to U.S. Provisional Patent Application No. 60/502,752 entitled "A Method And System for Restoration of a Mobile Device to its State Prior To Loss of Standard Memory" by Dennis Huanyu Wu, Huy Nguyen, Zhenye Zhu, and Vinay Kothiyal, filed on Sep. 12, 2003, which is incorporated by reference as if set forth herein in its entirety.

BACKGROUND

The disclosed invention relates in general to the field of enterprise mobile networks. More particularly, the invention relates to a method and system for installation and use of persistent agents in mobile devices to provide enterprise mobility management.

Nowadays, enterprises are focusing on providing greater mobility and flexibility to their employees. Providing mobility to the enterprise involves eliminating physical boundaries and facilitating the access of corporate applications and data from remote locations. Mobile devices help to support enterprise mobility by enabling remote access to applications and data. As a result, there has been a surge in the usage of mobile devices like Personal Digital Assistants (PDA), mobile phones, pagers and the like.

Mobile devices can be enabled through wireless and wired networks. Examples of wireless networks include Wireless Local Area Networks (WLANs), Wideband Wireless Local Area Networks (WWLANs), Wireless Fidelity (WiFi) networks, and Virtual Private Networks (VPNs). Mobile devices operating in wireless networks offer a number of benefits to the enterprise. These include providing remote access to corporate data, reducing errors in transactions, providing faster response to customer needs, and the like. By way of an example, mobile access through wireless networks to enterprise applications such as Customer Relationship Management (CRM) and Enterprise Resource Planning (ERP) increase productivity. Mobile access provides field service personnel with the ability to update orders, provide pricing and inventory information, access corporate documentation and the like.

There exist a number of technologies for enabling mobile devices over wireless networks. Examples of such technologies include Code Division Multiple Access (CDMA), General Packet Radio Service (GPRS), and the like. The connections to wireless networks are defined by protocols such as IEEE standards 802.11a, 802.11b, and 802.11g. Architectures such as Cellular Digital Packet Data (CDPD) provide specifications for supporting wireless access to the Internet and other public packet based networks.

Enterprises face many challenges in the effective deployment, security, management, and support of mobile devices in wireless networks. The effective deployment of mobile devices involves creation of an inventory of available devices and users, besides tracking of Network Interface Cards (NIC) used by the devices to connect to the network. Furthermore, deployment also involves tracking of the service plans and accounts. These service plans and accounts can be associated to the individual NICs. The service plans contain configuration settings that may be applied to each mobile device. Other issues of importance in deployment include installation of standard and custom software, configuration of the devices with standard and personalized settings, and activation of all the devices on the network.

There exist methods and systems in the art, which address the issue of the challenges involved in the effective deployment of client applications onto mobile devices. One such system is described in US Application No. 20030041125, titled "Internet-Deployed Wireless System". This patent application relates to the installation and configuration of application software on mobile devices over wireless networks. The Internet deployed system comprises an application server program. This application server program is downloaded and executed on remote wireless application server computers. The program is configured to transmit and install client applications onto portable devices. The client applications are configured to communicate with a local wireless application server computer over a wireless network.

Apart from issues related to deployment, enterprises also face considerable challenges in the security, management, and support of mobile devices over wireless networks. Some of the problems encountered include configuration of security settings, prevention of unauthorized access to the device, delivering software updates to remote users, monitoring device status, provision of facilities for detection, troubleshooting, diagnosis, repairing of end-user problems, restoration of applications and data, and the like.

There exist methods in the art that address the issues of security, management, and support of networked systems. One such method is described in WIPO Publication No. 0126287 A1, assigned to Critical Devices, Inc. titled "Method and System for Device Status Tracking". This invention deals with provision of monitoring and tracking services for a plurality of devices. A user contracts with an operations center for services. After contracting the service, the operations center provides an agent, which is downloaded onto the user's device. This installed agent communicates with the operations center. The system further comprises an exception sentinel to monitor the status of selected monitored devices from a monitor server associated with the user's site. Based on the status data, the sentinel communicates data to an operations center. The operations center can generate alerts in response to the received data.

In addition to the challenges mentioned above, a significant problem with respect to mobile devices is related to volatile memory storage. A mobile device stores applications and data in a standard memory storage. The standard memory storage is volatile in nature, i.e., it retains applications and data as long as power is available. When power is lost, due to a discharged battery or otherwise, the contents of the device's standard memory are completely lost. The device is then reset to factory conditions with only the applications and data being stored in its persistent memory. Restoration of the device to its original working condition requires manual re-installation of applications and restoration of data. One method of restoration of a mobile device is by linking it up with a PC or a laptop, and transferring the required applications and data from the PC or the laptop onto the mobile device.

There exist a variety of products that attempt to solve the problem of deploying and installing applications and data onto the volatile memory storage of mobile devices. Examples of such products include Mobile Device Management Suite™, a product of SupportSoft, USA, and Concordia™, a product of Mitsubishi Electric Research Laboratories, USA. Both these products provide tools for deployment, management, security, and support of mobile devices in wireless networks. Independent software programs called agents, that run on the mobile devices in the network, facilitate the functions of deployment, management, security, and support products. However, these products do not enable remote reinstallation of applications and data and restoration of mobile devices in the absence of the wireless network connection. They also do not deal with the persistent storage of the agents on the mobile devices.

The patent applications and products cited above suffer from one or more of the following limitations. Firstly, a solution for the restoration of applications and data in mobile devices to its state prior to loss of standard memory storage is not provided. Secondly, a complete solution providing persistent storage to the agents that facilitate deployment, management, security, and support of applications and data in mobile devices has not been provided in the art.

From the above discussion, it is evident that there is a need for an automated solution that facilitates remote deployment and restoration applications and data to its state prior to loss of standard memory storage in mobile devices. Furthermore, the solution should provide for persistent storage of the agents that facilitate deployment, management, security, and support of applications and data in mobile devices. Moreover, there is also a need for a solution that supports large-scale deployment of mobile devices. The solution should facilitate the centralized deployment, security, management, and support of mobile devices in wireless network environments.

SUMMARY

The disclosed invention provides a method, system, and computer program product for restoration of a mobile device to its state prior to loss of application software and data stored in a standard memory storage of the mobile device.

An aspect of the disclosed invention is to provide an automated solution for restoration of the application software and the data lost from the standard memory storage of a mobile device.

Another aspect of the disclosed invention is to provide persistence to the core agent deployed into the standard memory storage of the mobile device.

Yet another aspect of the disclosed invention is to support the large scale centralized deployment of mobile devices in a networked environment.

The disclosed invention comprises a "core agent" (defined below) deployed into the standard memory storage of the mobile device. The invention also comprises a "persistent agent" (defined below) deployed into the persistent memory storage of the mobile device. The persistent agent is an installation version of the core agent. The core agent is re-deployed into the standard memory storage of the mobile device using the deployed persistent agent in the event of loss of application software and data stored in standard memory storage. The core agent facilitates the deployment of the application software and the data into the standard memory storage of the mobile device.

BRIEF DESCRIPTION OF THE DRAWINGS

The various embodiments of the invention will hereinafter be described in conjunction with the appended drawings provided to illustrate and not to limit the invention, wherein like designations denote like elements, and in which.

DETAILED DESCRIPTION

For convenience, appropriate explanations of some terms used in the description of embodiments, are given below. It is to be understood that these explanations are given merely to aid better understanding of the description, and that they are not to be considered as limiting the scope of the invention as claimed.

DEFINITIONS

Standard Memory Storage: This means a volatile memory storage of a mobile device. Application software and data stored in this volatile memory storage are lost in the event of loss of battery power to the mobile device.

Persistent Memory Storage: This means a permanent memory storage of a mobile device. Application software and data stored in this permanent memory storage are retained in the event of loss of battery power to the mobile device.

Core Agent: This means a software agent that is deployed into a standard memory storage of a mobile device. This software agent initializes with a host server and facilitates the deployment of associated application software and data into the standard memory storage of the mobile device.

Persistent Agent: This implies an installation version of the core agent that is stored in a persistent memory storage of a mobile device. This installation version remains in the persistent memory storage even if the battery power is lost, and facilitates the restoration of the core agent and the associated application software and data into the standard memory storage of the mobile device.

Figure 1:
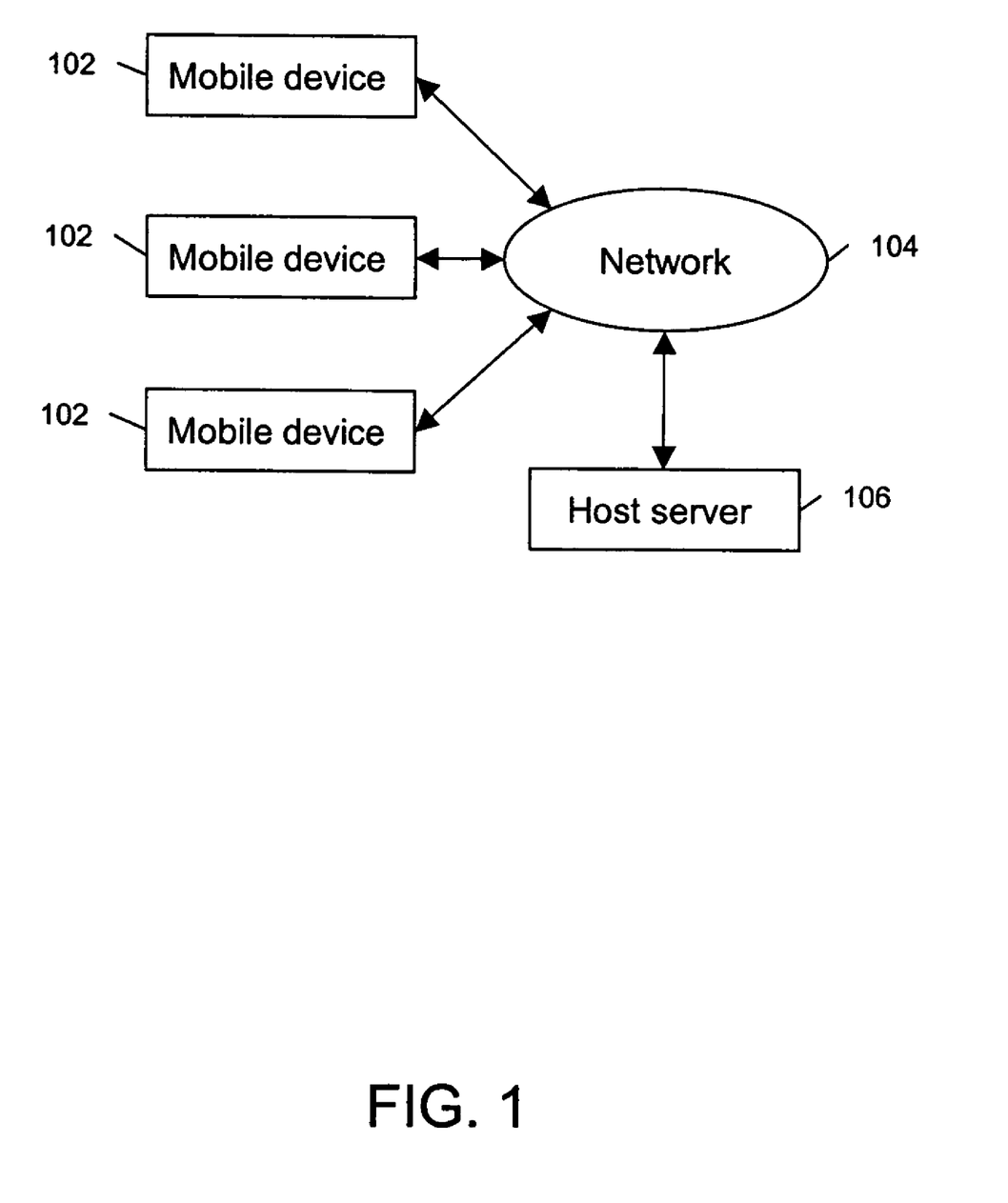
FIG. 1 is a block diagram illustrating the general environment of the invention.

FIG. 1 is a block diagram illustrating the general environment of the invention. The disclosed invention is deployed in a network 104 comprising a plurality of mobile devices 102 and at least one host server 106. There may be more than one host server 106 at a single site location. Furthermore, host server 106 may serve more than one site location. For example, an organization may have several site locations like a field location and an office location. Each site location may have more than one host servers 106, to better serve the population of mobile devices 102. A host server 106 may comprise and/or have access to computer usable media comprising at least magnetic disk media, as is commonly found in computer hard drives, magnetic tape media, as is commonly found in computer tape drives, optical disk media, as is found in CD-ROMs and DVDs, as well as random access memory ("RAM"), read only memory ("ROM"), and/or EROM. Moreover, both the field as well as office locations may share the same host server 106. Network 104 may be a wired or a wireless network. Wired networks can be in the form of Local Area Networks (LANs), Metropolitan Area Networks (MANs), Wide Area Networks (WANs) and the like. Examples of wireless networks include Wireless Local Area Networks (WLANs), Wideband Wireless Local Area Networks (WWLANs), Wireless Fidelity (WiFi) networks, and Virtual Private Networks (VPNs). Mobile devices 102 may include a variety of devices such as laptop PCs, Personal Digital Assistants (PDAs), pen tablets, smart phones and the like. Apart from mobile devices 102, network 104 also comprises various other components such as hubs, routers, and switches. Technologies such as Ethernet and the Internet are used to enable wired connectivity. Connectivity to wireless networks can be enabled with the help of connection standards such as Code Division Multiple Access (CDMA), General Packet Radio Service (GPRS), and IEEE standards such as 802.11a, 802.11b, and 802.11g.

Figure 2:
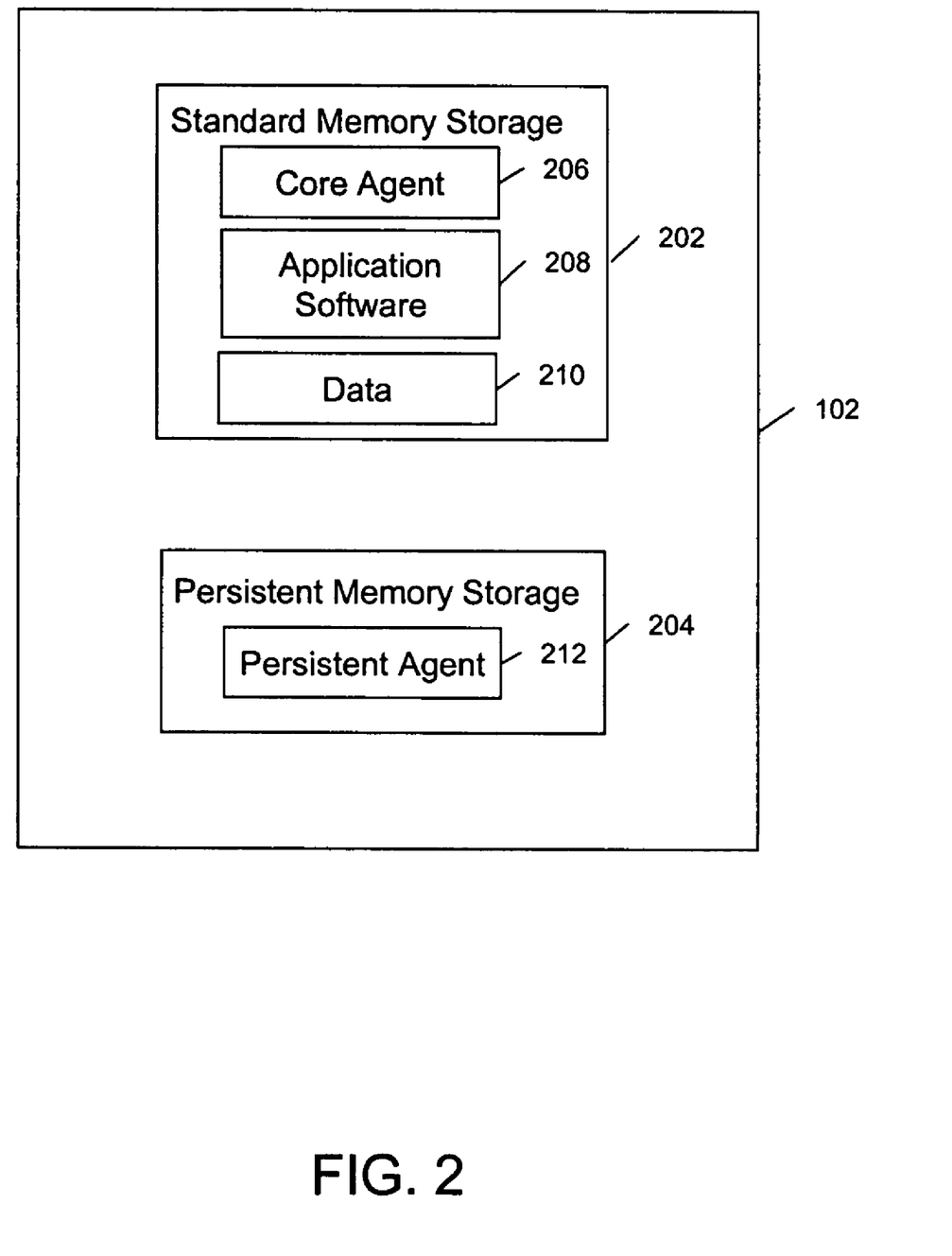
FIG. 2 is a block diagram illustrating the configuration of the storage memory of a mobile device.

FIG. 2 is a block diagram illustrating the configuration of the storage memory of mobile device 102. Mobile device 102 comprises a standard memory storage 202 and a persistent memory storage 204. A Random Access Memory (RAM) can be used as standard memory storage 202. Standard memory storage 202 is used to store a core agent 206 besides storing application software 208 and data 210 used in mobile device 102. The functions performed by core agent 206 will be explained in detail later in the description in conjunction with FIG. 3, FIG. 4, and FIG. 5. Application software 208 may include databases, and software such as Microsoft® Office, Adobe Acrobat®. Data 210 comprises data files, configuration settings, addresses of host servers 106 and the like. The examples described above are for illustrative purposes only and do not limit the scope of the disclosed invention, which can be implemented for other kinds of application software 208 and data 210.

An example of persistent memory storage 204 is the Erasable Read Only Memory (EROM). Persistent memory storage 204 is used to store a persistent agent 212. Persistent agent 212 is an installation version of core agent 206. The installation version of core agent 206 can be a Cabinet (CAB) file. A CAB file contains installation files such as .dll, .exe and .ini files, registry information and the like. A CAB file is well known in the art and the composition of the CAB file, which is applicable to the disclosed invention, will be apparent to anyone skilled in the art.

Standard memory storage 202 is volatile in nature. Continuous power supply is required in order to sustain the contents of standard memory storage 202. Therefore, application software 208 and data 210 stored in standard memory storage 202 are lost in the event of loss of battery power in mobile device 102. However, information is stored permanently in persistent memory storage 204. Information stored in persistent memory storage 204 is not lost in the event of loss of battery power in mobile device 102.

Figure 3:
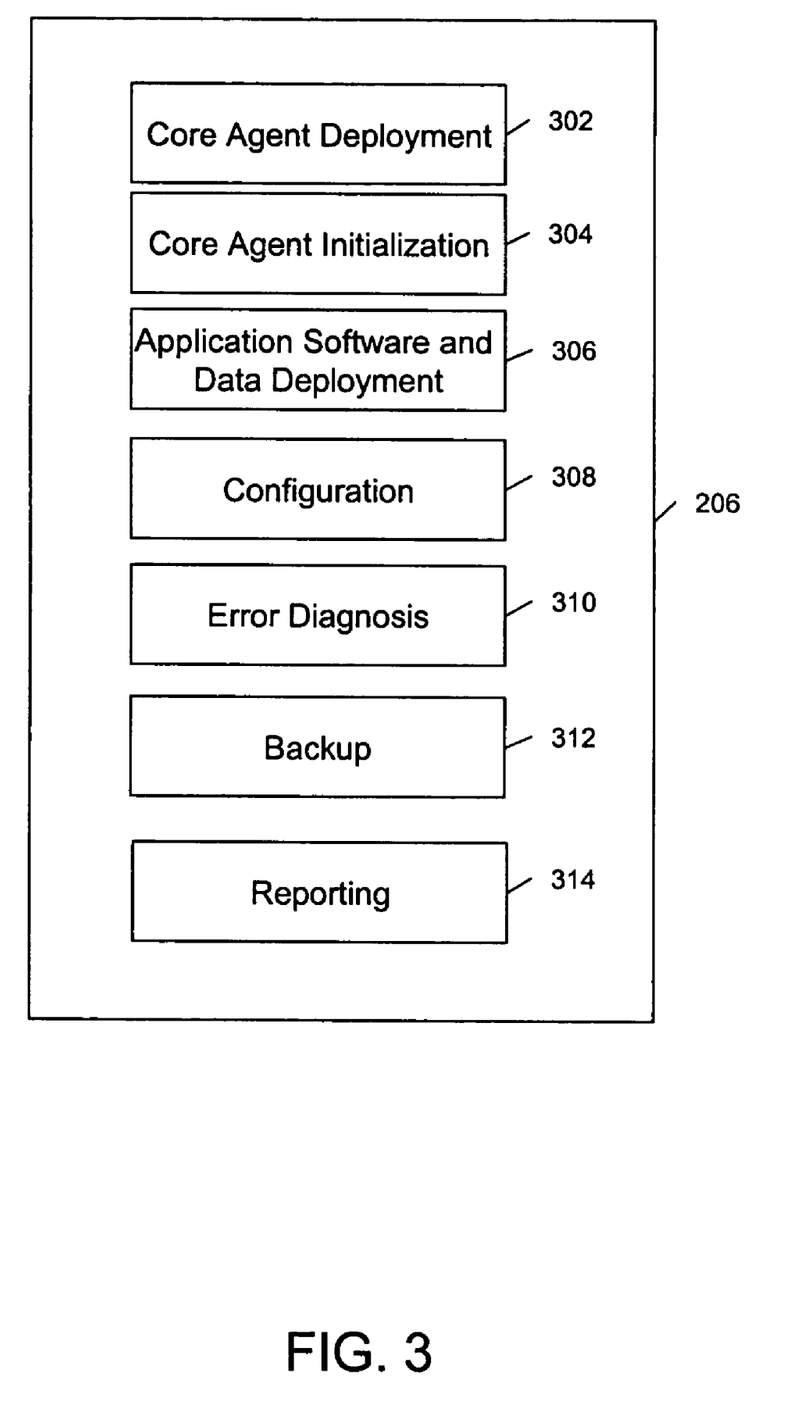
FIG. 3 is a block diagram illustrating the modular software framework of the core agent in an embodiment of the invention.

Core agent 206 is a software agent that is deployed into standard memory storage 202 of mobile device 102. This software agent is built in a modular fashion and consists of a number of software modules. The modular structure of core agent 206 enables restructuring the framework of core agent 206 to make it suited to varying requirements. FIG. 3 is a block diagram illustrating the modular software framework of core agent 206 in an embodiment of the disclosed invention. The basic software modules include modules for core agent deployment 302, core agent initialization 304, and application software and data deployment 306. The additional software modules include modules for configuration 308, error diagnosis 310, reporting 312, and backup 314. The functionalities of each of these modules will be explained in detail in conjunction with FIG. 5, FIG. 6, and FIG. 7.

Figure 4:
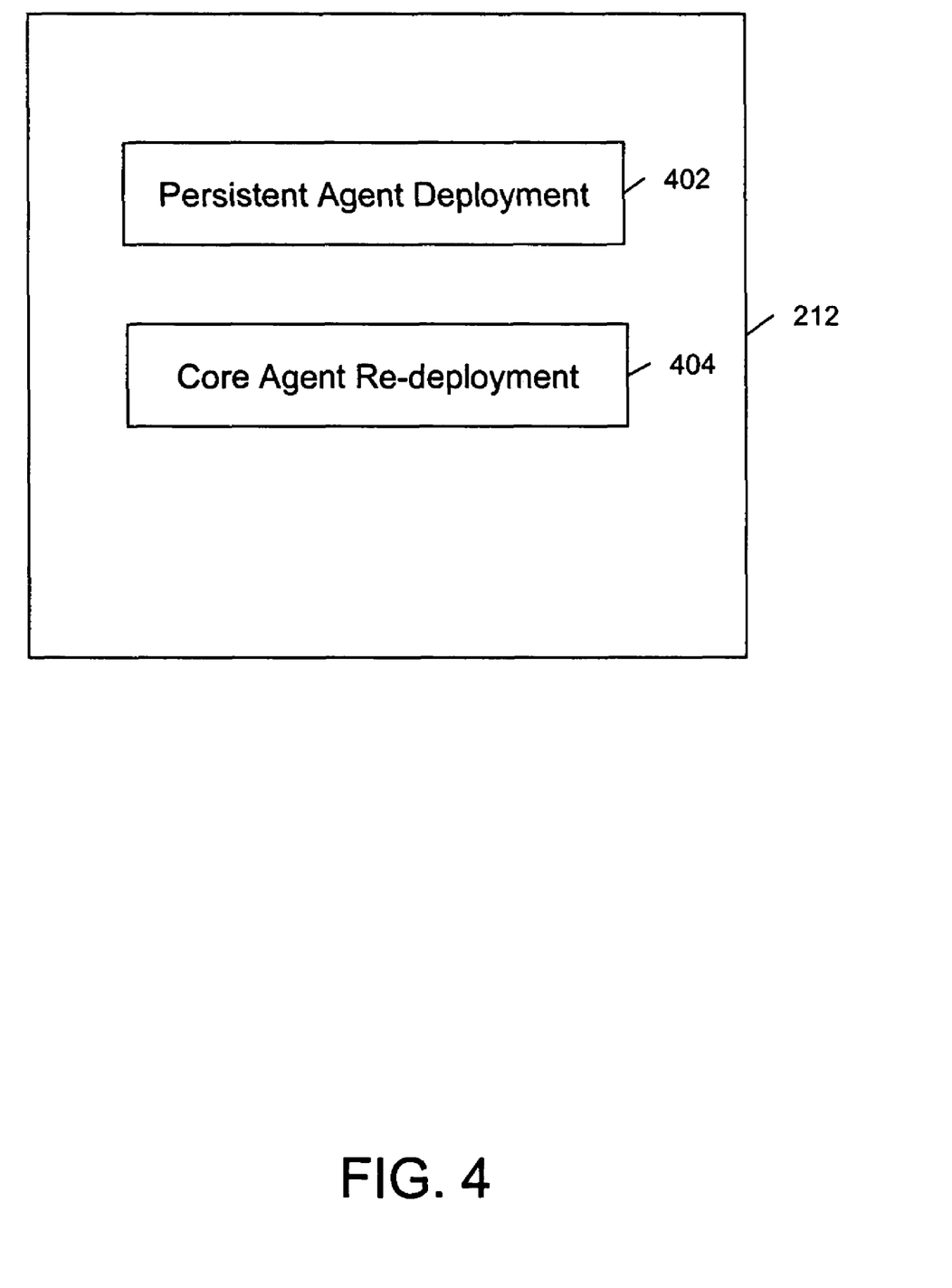
FIG. 4 is a block diagram illustrating the modular software framework of the persistent agent in an embodiment of the invention.

FIG. 4 is a block diagram illustrating the modular software framework of persistent agent 212 in an embodiment of the disclosed invention. Persistent agent 212 is an installation version of core agent 206. Persistent agent 212 is also built on a modular framework. The basic software modules include modules for persistent agent deployment 402 and core agent re-deployment 404. The functionalities of these modules will be explained in detail in conjunction with FIG. 5, FIG. 6, and FIG. 7.

Figure 5:
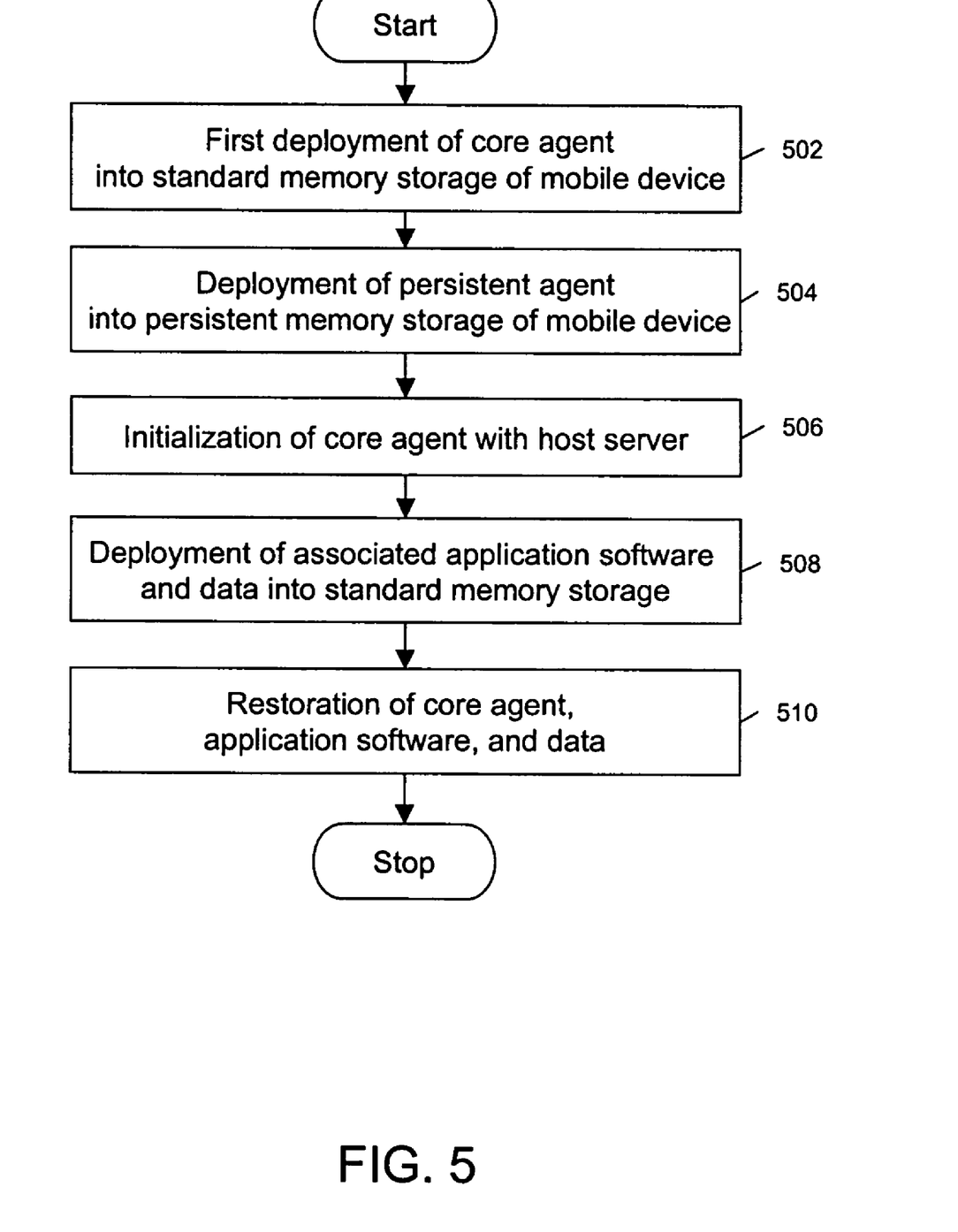
FIG. 5 is a flow chart illustrating the method steps involved in the implementation of the invention.

FIG. 5 is a flow chart illustrating the method steps involved in the implementation of the disclosed invention. At step 502, core agent 206 is deployed into standard memory storage 202 of mobile device 102 for the first time. In an embodiment of the invention, the deployment of core agent 206 is completed through host server 106, using core agent deployment 302 module. The deployment can be done using a web installer. Mobile device 102 is placed on a cradle during this process. The cradle enables transfer of data between mobile device 102 and host server 106. Core agent 206 communicates with the host server through a Hyper Text Transfer Protocol (HTTP) connection. Data is transferred back-and-forth between the core agent and the host server. This data includes information regarding the hardware and software requirements of mobile device 102. At step 504, persistent agent 212 is deployed into persistent memory storage 204 of mobile device 102. The deployment of persistent agent 212 is done using persistent agent deployment 402 module. In an embodiment of the invention, the deployment of persistent agent 212 is also done from host server 106 when mobile device 102 is connected to network 104.

In another embodiment of the invention, persistent agent 212 is first deployed in persistent memory storage 204 of mobile device 102. Thereafter, this deployed persistent agent 212 is used to deploy core agent 206 into standard memory storage 202 of mobile device 102. The deployment of core agent 206 is done by invoking a boot loader. The boot loader is a .exe file resident in persistent memory storage 204. The boot loader copies the installation version of core agent 206 into standard memory storage 202 and executes it. On execution of the installation version, core agent 206 is installed into standard memory storage 202 of mobile device 102.

At step 506, core agent 206 is initialized with host server 106. The initialization of core agent 206 is undertaken through core agent initialization 304 module. Once initialization is complete, an initialization (.ini) file containing the address of host server 106 is copied into persistent memory storage 204. After core agent 206 initializes with host server 106, a standard image is created at host server 106 for mobile device 102. The standard image is a list of application software 208 and data 210 that are applicable to mobile device 102. Use of a standard image provides host server 106 with the ability to associate application software 208 and data 210 with various mobile devices 102 based on their individual requirements. The standard image may be created completely at host server 106 without any involvement at mobile device 102. Alternatively, the standard image may also include application software 208 and data 210 requested by mobile device 102. These associated application software 208 and data 210 are then loaded into mobile device 102. The deployment of associated application software 208 and data 210 is an automatic process carried out by core agent 206 using the application software and data deployment 306 module. Involvement of mobile device 102 is not required to carry out the deployment process.

At step 508, application software 208 and data 210 associated with mobile device 102 are deployed from host server 106 using deployed core agent 206. At step 510, core agent 206, application software 208, and data 210 are restored in mobile device 102. This is done in the event that core agent 206, application software 208, and data 210 are erased from standard memory storage 202 of mobile device 102.

Figure 6:
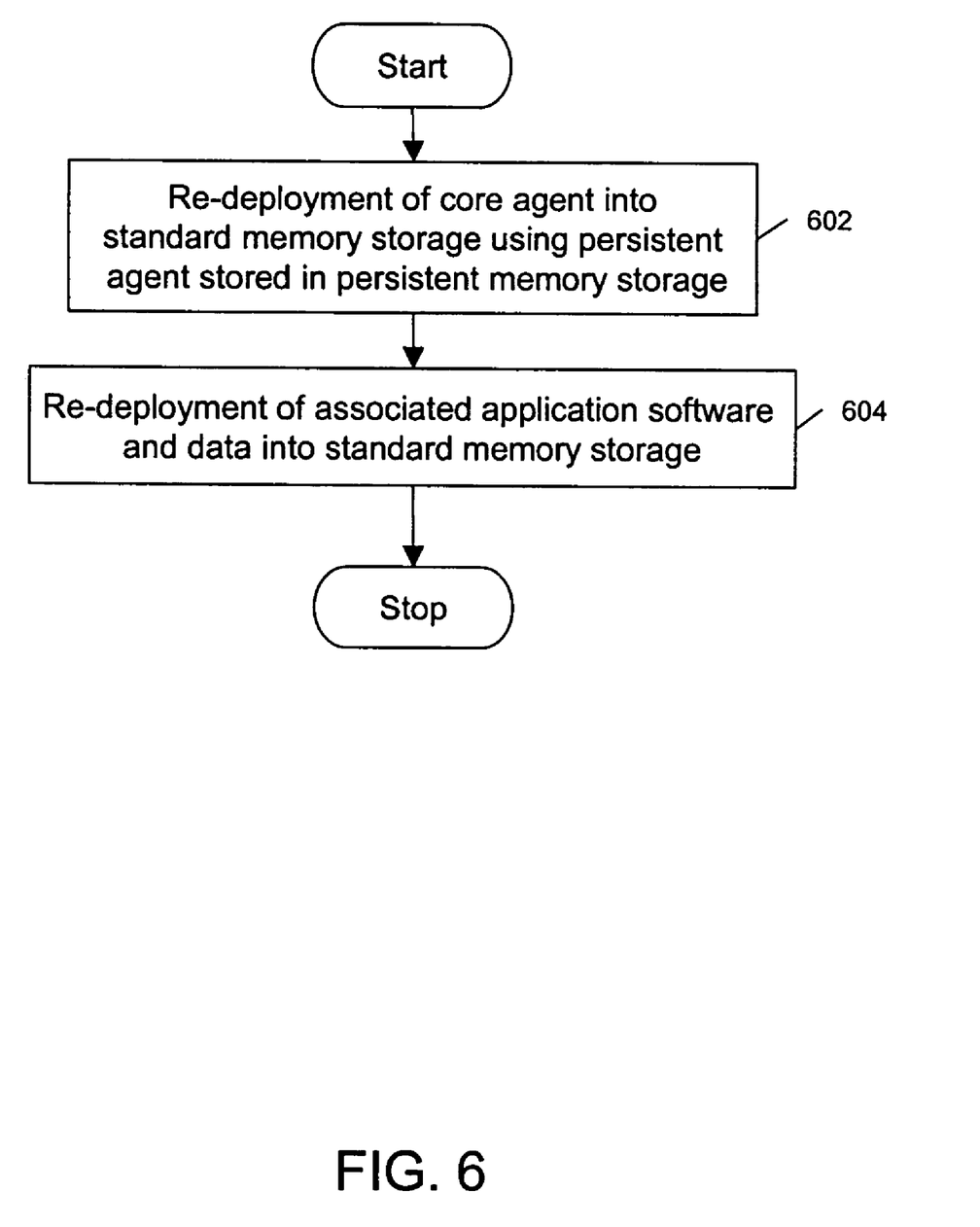
FIG. 6 is a flow chart illustrating the method steps involved in the restoration of the core agent, and the associated application software and data into the mobile device.

FIG. 6 is a flow chart illustrating the method steps involved in the restoration of core agent 206, and associated application software 208 and data 210 into mobile device 102. Core agent 206, application software 208, and data 210 are erased from standard memory storage 202 under certain conditions such as loss of battery power of mobile device 102. However, persistent agent 212 remains in persistent memory storage 204. This is because persistent memory storage 204 is not volatile like standard memory storage 202. At step 602, persistent agent 212 is invoked to re-deploy core agent 206 into standard memory storage 202 of mobile device 102 using core agent re-deployment 404 module. At step 604, application software 208 and data 210 associated with mobile device 102 are re-deployed into standard memory storage 202 using the re-deployed core agent 206.

Figure 7:
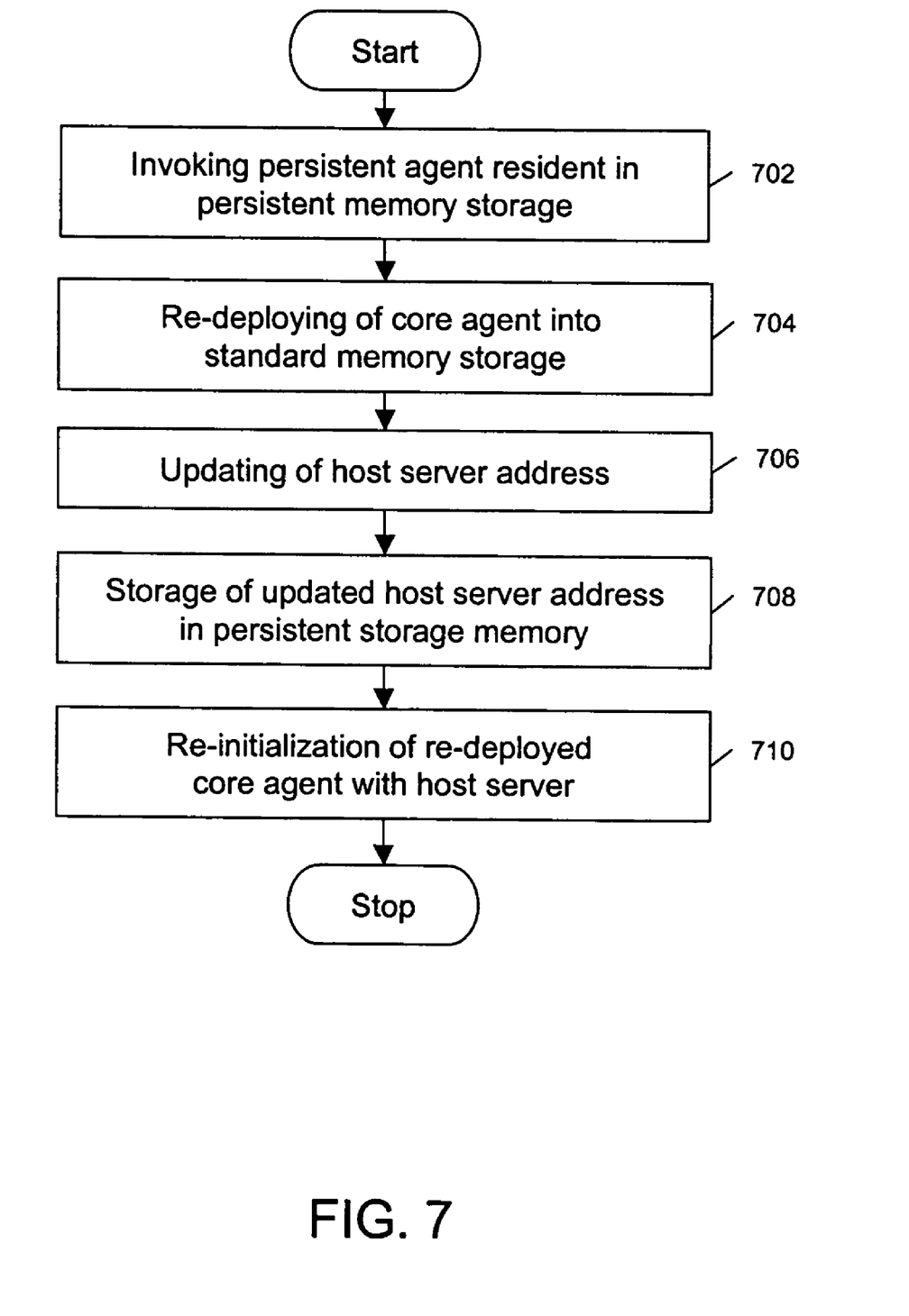
FIG. 7 is a flow chart illustrating the method steps involved in the re-deployment of the core agent into the mobile device.

FIG. 7 is a flow chart illustrating the method steps involved in the re-deployment of core agent 206 into mobile device 102. At step 702, persistent agent 212 is invoked by recharging mobile device 102 and thereafter, browsing through on a file explorer of mobile device 102 and clicking on the icon for persistent agent 212. The file explorer is a utility tool to view and access the files available in standard memory storage 202. Once clicked, the boot loader (bootloader.exe) resident in persistent memory storage 204 is invoked. At step 704, the invoked boot loader re-deploys core agent 206 into standard memory storage 202 of mobile device 102. Once core agent 206 is re-deployed, at step 706, the address of host server 106 is updated. Thereafter, at step 708, the updated address of host server 104 is written into persistent memory storage 204. At step 710, the re-deployed core agent 206 re-initializes with host server 106 when mobile device 102 is connected to network 104. Core agent 206 is authenticated with host server 106 by inputting a defined username and password. Once core agent 206 has been initialized and authenticated, core agent 206 identifies the missing application software 208 and data 210 on mobile device 102. Thereafter, core agent 206 automatically restores the associated application software 208 and data 210 onto mobile device 102. Core agent 206 communicates with host server 106, which then deploys the associated application software 208 and data 210 onto mobile device 102. At this stage, host server 106 is in possession of the standard image of application software 208 and data 210 that are associated with mobile device 102. Therefore, the need for creation of a new image for mobile device 102 is eliminated.

Apart from deployment of application software 208 and data 210, the other functionalities of core agent 206 resident in standard memory storage 202 include configuration of mobile devices 102 and network connections, diagnosis of errors, and rectification of errors. Core agent 206 can perform these functionalities in the absence of a connection to network 104 whereby mobile device 102 operates in a stand-alone manner. When connected to network 104, core agent 206 can also perform centralized reporting, automated backup of information, deployment of new software, and execution of remote security commands.

Core agent 206 is capable of configuring each device based on user, hardware, software and network 104 requirements using configuration 308 module. These configurations are defined for each individual mobile device 102. The defined configuration is deployed on mobile device 102. Thereafter, the deployed configuration is automatically tested to ensure that the deployment has been carried out correctly. Specific functions include configuration of standard applications such as Microsoft® Pocket Outlook, Microsoft® Pocket Internet Explorer, reading and resetting of device configurations such as memory, clock, power, backlight, password, and network interface settings.

Core agent 206 also provides automated diagnosis and rectification of errors through error diagnosis 310 module. This procedure involves testing all configurations, identification of errors on network 104, mobile device 102, and application software 208, and categorization of errors. Rectifiable errors can be fixed without any support from host server 106. Core agent 206 runs its diagnosis tests at pre-set scheduled times. Based on the results of the diagnostic tests, core agent 206 will take an action. In some cases, the action is to log the results without rectification of the error.

When mobile device 102 is connected to network 104, core agent 206 can create a log as well as report to host server 106 all activities performed on mobile device 102 using reporting 312 module. These reported activities include application software 208 installation, diagnostic tests, error alerts and the like. Core agent 206 also enables automatic backup of critical application software 208 and data 210 stored in mobile device 102 through its backup 314 module. These backups are enabled by placing copies of critical application software 208 and data 210 directly on host server 106. The backed up data can be restored in mobile device 102 in the event that the data is erased from storage. The specific functions in providing backup include scheduling of backups based on the connection to network 104, the bandwidth, and the like. It could also include provision of incremental backups wherein the incremental changes made to information are sent to host server 106. Incremental backup of information reduces the amount of duplicate data being transmitted across a connection.

Connection to network 104 also enables enhanced diagnosis and rectification of errors occurring in mobile device 102. This can be done by a combination of core agent 206 and host server 106. The functionalities provided include initiation of diagnostic tests on mobile device 102, tracking of test status and errors, applying fixes to reported errors and the like.

The various embodiments of the invention may be implemented on mobile devices 102 using OSs like Pocket PC, Windows® CE, Windows Mobile Software for Pocket PC, Palm OS®, Palm OS® v.5, Symbian, and the like. The invention can be implemented using persistent memory storages 204 such as Ipaq 20M ROM, Dell™ 20M ROM, HP 20M ROM, in association with Intel® Storage Management Support. It should be apparent to anyone skilled in the art that the examples and implementations mentioned above are for illustrative purposes only. The disclosed invention can be implemented with various other examples and implementations as well without deviating from the scope of the invention.

The disclosed invention provides various advantages over the existing art. Firstly, it provides an automated solution for restoration of application software and data lost from the standard memory storage of a mobile device. The restoration is done in an automated and consistent manner that is supported across multiple mobile devices. The invention helps automate processes that were previously carried out manually. The workload involved in manual restoration of application software and data in mobile devices is compounded greatly when large-scale deployment of mobile devices is undertaken. Thus, the invention supports the large-scale deployment of mobile devices by providing an automated method of restoration of mobile devices. The invention also discloses a method for providing persistence to the core agent deployed in the standard memory storage of the mobile device. Furthermore, the invention facilitates centralized deployment, security, management, and support of mobile device in a networked environment.

While the various embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A computer program product for use with a computer, the computer program product comprising a computer usable medium having a computer readable program code embodied therein for restoration of a mobile device to a state prior to loss of application software and data, the application software and the data being stored in standard memory storage, the mobile device having a standard memory storage and a persistent memory storage, the computer program code performing the steps of:
   a. deploying a core agent into the standard memory storage of the mobile device;
   b. deploying a persistent agent into the persistent memory storage of the mobile device, the persistent agent being an installation version of the core agent; and
   c. re-deploying the core agent into the standard memory storage of the mobile device using the deployed persistent agent in the event of loss of application software and data stored in standard memory storage.

2. The computer program product as recited in claim 1 further comprising a computer program code for deploying the application software and the data into the standard memory storage of the mobile device.

3. The computer program product as recited in claim 1 further comprising a computer program code for executing the core agent when the mobile device is connected to at least one host server.

4. The computer program product as in claim 3 wherein the computer program code for executing the core agent when the mobile device is connected to at least one host server comprises a computer program code performing the tasks of:
   d. communicating the application software and the data between the mobile device and the host server;
   e. configuring the mobile device;
   f. troubleshooting errors on the mobile device;
   g. rectifying errors;
   h. centralized reporting of activities performed on the mobile device to the host server; and
   i. transferring copies of the application software and the data stored on the mobile device to the host server.

5. The computer program product as recited in claim 4 wherein the computer program code performing the task of communicating between the mobile device and the host server comprises a computer program code for performing the tasks of:
   j. capturing hardware and software information from the mobile device; and
   k. reporting the hardware and software information back to the host server.

6. The computer program product as recited in claim 1 further comprising a computer program code for executing the core agent when the mobile device is operating in a standalone manner.

7. The computer program product as in claim 6 wherein the computer program code for executing the core agent when the mobile device is operating in a stand alone manner comprises a computer program code performing the tasks of:
   l. configuring the mobile device;
   m. troubleshooting errors on the mobile device; and
   n. rectifying errors.

8. A method for restoration of a mobile device to a state prior to loss of application software and data, the application software and the data being stored in standard memory storage, the mobile device having a standard memory storage and a persistent memory storage, the method comprising the steps of:
   a. deploying a core agent into the standard memory storage of the mobile device;
   b. deploying a persistent agent into the persistent memory storage of the mobile device, the persistent agent being an installation version of the core agent; and
   c. re-deploying the core agent into the standard memory storage of the mobile device using the deployed persistent agent in the event of loss of the application software and the data stored in the standard memory storage.

9. The method as recited in claim 8 further comprising the step of deploying the application software and the data into the standard memory storage of the mobile device using the core agent.

10. The method as recited in claim 8 further comprising the step of executing the core agent, the step being performed when the mobile device is connected to at least one host server.

11. The method as recited in claim 10 wherein the step of executing the core agent when the mobile device is connected to at least one host server comprises:
   d. communicating the application software and the data between the mobile device and the host server;
   e. configuring the mobile device;
   f. troubleshooting errors on the mobile device;
   g. rectifying errors;
   h. centralized reporting of activities performed on the mobile device to the host server; and
   i. transferring copies of the application software and the data stored on the mobile device to the host server.

12. The method as recited in claim 11 wherein the step of communicating between the mobile device and the host server comprises:
   j. capturing hardware and software information from the mobile device; and
   k. reporting the hardware and software information back to the host server.

13. The method as recited in claim 8 further comprising the step of executing the core agent, the step being performed when the mobile device is operating in a stand-alone manner.

14. The method as recited in claim 13 wherein the step of executing the core agent when the mobile device is operating in a stand alone manner comprises:
   l. configuring the mobile device;
   m. troubleshooting errors on the mobile device; and
   n. rectifying errors.

15. A method for restoration of a mobile device to a state prior to loss of application software and data, the application software and the data being stored in standard memory storage, the mobile device having a standard memory storage and a persistent memory storage, the method comprising the steps of:
   a. deploying a core agent into the standard memory storage of the mobile device;
   b. deploying a persistent agent into the persistent memory storage of the mobile device, the persistent agent being an installation version of the core agent;
   c. re-deploying the core agent into the standard memory storage of the mobile device using the deployed persistent agent in the event of loss of application software and data stored in standard memory storage; and d. deploying the application software and the data into the standard memory storage of the mobile device using the core agent, wherein the core agent automatically deploys the application software and the data by communicating with at least one host server.

16. The method as recited in claim 15 further comprising the step of executing the core agent, the step being performed when the mobile device is connected to at least one host server.

17. The method as recited in claim 16 wherein the step of executing the core agent when the mobile device is connected to at least one host server comprises:
 e. communicating the application software and the data between the mobile device and the host server;
 f. configuring the mobile device;
 g. troubleshooting errors on the mobile device;
 h. rectifying errors;
 i. centralized reporting of activities performed on the mobile device to the host server; and
 j. transferring copies of the application software and the data stored on the mobile device to the host server.

18. The method as recited in claim 17 wherein the step of communicating between the mobile device and the host server comprises:
 k. capturing hardware and software information from the mobile device; and
 l. reporting the hardware and software information back to the host server.

19. The method as recited in claim 15 further comprising the step of executing the core agent, the step being performed when the mobile device is operating in a stand-alone manner.

20. The method as recited in claim 19 wherein the step of executing the core agent when the mobile device is operating in a stand alone manner comprises:
 m. configuring the mobile device;
 n. troubleshooting errors on the mobile device; and
 o. rectifying errors.

* * * * *